(12) United States Patent
Lee et al.

(10) Patent No.: US 9,390,482 B2
(45) Date of Patent: Jul. 12, 2016

(54) IMAGE PROCESSING APPARATUS AND METHOD OF PROCESSING IMAGE

(71) Applicants: INDUSTRY-ACADEMIC COOPERATION FOUNDATION, YONSEI UNIVERSITY, Seoul (KR); HANWHA TECHWIN CO., LTD., Changwon-Si (KR)

(72) Inventors: Chang-min Lee, Changwon (KR); Moon-Gi Kang, Seoul (KR); Hee Kang, Seoul (KR)

(73) Assignees: INDUSTRY-ACADEMIC COOPERATION FOUNDATION, YONSEI UNIVERSITY, Seoul (KR); Hanwha Techwin Co., Ltd., Changwon-si (KR)

(*) Notice: Subject to any disclaimer, the term of this patent is extended or adjusted under 35 U.S.C. 154(b) by 430 days.

(21) Appl. No.: 13/942,962

(22) Filed: Jul. 16, 2013

(65) Prior Publication Data

US 2014/0153820 A1    Jun. 5, 2014

(30) Foreign Application Priority Data

Dec. 3, 2012   (KR) ........................ 10-2012-0139267

(51) Int. Cl.
*G06T 5/00*   (2006.01)

(52) U.S. Cl.
CPC ....... *G06T 5/007* (2013.01); *G06T 2207/10024* (2013.01); *G06T 2207/20012* (2013.01)

(58) Field of Classification Search
USPC ......................................... 382/274, 254–255
See application file for complete search history.

(56) References Cited

U.S. PATENT DOCUMENTS

| | | | | |
|---|---|---|---|---|
| 6,563,945 B2 * | 5/2003 | Holm | ................... | H04N 1/4072 348/582 |
| 6,987,544 B2 * | 1/2006 | Ogata | ..................... | G06T 5/007 348/678 |
| 7,742,653 B2 * | 6/2010 | Imai | ........................ | G06T 5/007 382/264 |
| 8,040,411 B2 * | 10/2011 | Nakajima | ............... | G06T 5/009 348/254 |
| 8,135,235 B2 * | 3/2012 | Kang | ....................... | H04N 5/20 345/604 |
| 8,150,201 B2 * | 4/2012 | Kasai | ................... | H04N 5/2351 382/274 |
| 8,285,134 B2 * | 10/2012 | Joo | ........................ | H04N 5/235 348/663 |
| 8,760,537 B2 * | 6/2014 | Johnson | ..................... | G06T 5/50 348/222.1 |
| 8,803,985 B2 * | 8/2014 | Kaizu | .................. | H04N 5/2355 348/208.4 |
| 2009/0161953 A1 * | 6/2009 | Ciurea | ................. | H04N 1/4074 382/172 |

FOREIGN PATENT DOCUMENTS

| | | |
|---|---|---|
| JP | 2005-284534 A | 10/2005 |
| JP | 5083046 B2 | 11/2012 |
| KR | 10-1007101 B1 | 1/2011 |

\* cited by examiner

*Primary Examiner* — Ishrat I Sherali

(74) *Attorney, Agent, or Firm* — Sughrue Mion, PLLC

(57) ABSTRACT

Provided is an image processing apparatus that can effectively display an image by using an optimized dynamic range compression technique and a method of processing an image by using the same. The method includes: obtaining a first blurred image and a second blurred image from the input image; estimating illuminance of the input image by combining the first blurred image and the second blurred image; generating a dark region amplified image from the input image; generating a bright region conserved image from the input image; applying weights to the dark region amplified image and the bright region conserved image, respectively, according to the estimated illuminance; and combining the weighted dark region amplified image and the weighted bright region conserved image to generate a final image.

20 Claims, 9 Drawing Sheets

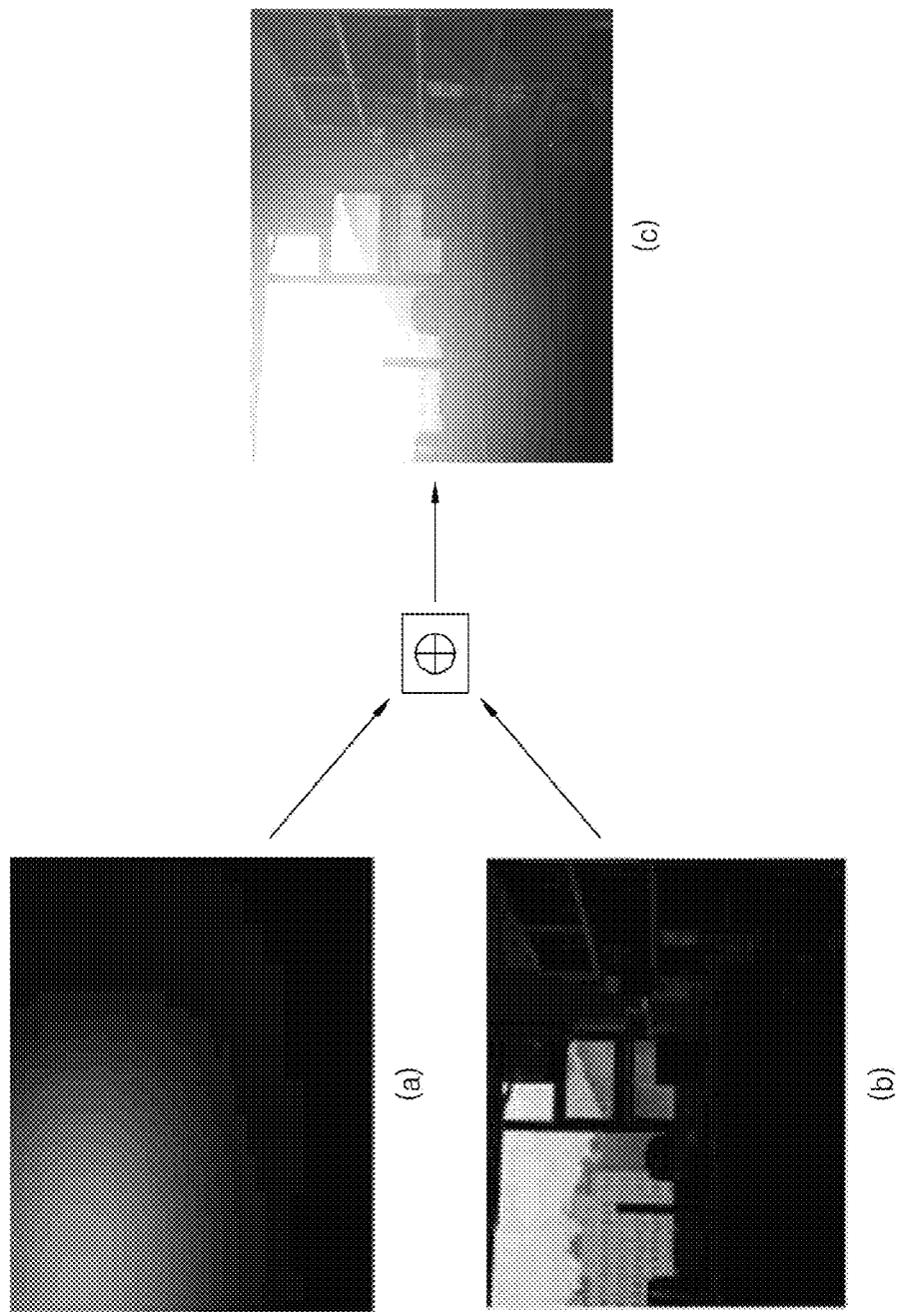

$$I_d = \max_l (I(i+x, j+y))$$

$$A_d = \frac{f((1-s) \cdot I_d + s \cdot \text{ILLUMINANCE})}{(1-s) \cdot I_d + s \cdot \text{ILLUMINANCE}}$$

$$f(\text{input}) = \text{MAX} \frac{\log(\frac{\text{input}}{\text{MAX}} + \delta - \log \delta)}{\log(1+\delta) - \log \delta}$$

$$A_{db} = \text{GaussianBlur}(A_d)$$

$$O_1 = I \times A_{db}$$

$$O_2 = \left(\frac{I}{I_d}\right)^\gamma \times I_d \times A_{db}$$

FIG. 7A

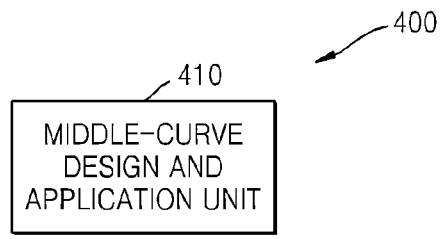

FIG. 7B $I \rightarrow I_d \rightarrow A'_d \rightarrow A'_{db} \rightarrow O_3$ $$I_d = \max_I (I(i+x, j+y))$$

$$A'_d = \frac{g((1-m) \cdot I_d + m \cdot \text{ILLUMINANCE})}{(1-m) \cdot I_d + m \cdot \text{ILLUMINANCE}}$$

$$g(\text{input}) = \text{MAX} \times \left(\frac{\text{input}}{\text{MAX}}\right)^{\left(\frac{1}{\alpha}\right)^{\frac{\text{input}-0.5 \times \text{MAX}}{0.5 \times \text{MAX}}}}$$

$$A'_{db} = \text{GaussianBlur}(A'_d)$$

$$O_3 = I \times A'_{db}$$

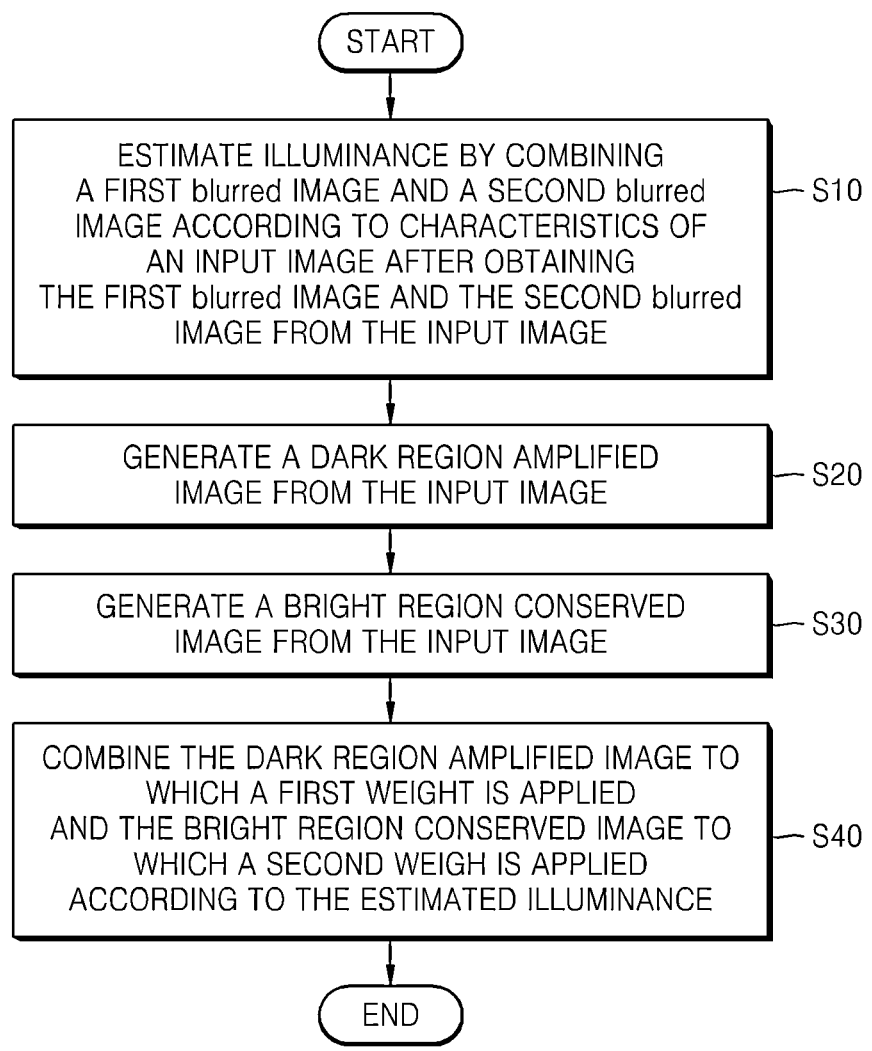

IMAGE PROCESSING APPARATUS AND METHOD OF PROCESSING IMAGE

CROSS-REFERENCE TO RELATED PATENT APPLICATION

This application claims priority from Korean Patent Application No. 10-2012-0139267, filed on Dec. 3, 2012, in the Korean Intellectual Property Office, the disclosure of which is incorporated herein in its entirety by reference.

BACKGROUND

1. Field

Apparatuses and methods consistent with exemplary embodiments relate to processing an image and, more particularly, to image processing that can effectively display an image by using an optimized dynamic range compression (DRC) technique.

2. Description of the Related Art

The DRC technique is used for increasing brightness of a portion of an image that is not clearly seen in a dark region and a bright region of the image by compressing a dynamic range that indicates a brightness ratio between a brightest region and a darkest region in the image. Generally, in order to increase brightness of an image, a tone-mapping function is used on an entire image. However, contrast is reduced and information is damaged on a specific region of the image.

It is known that a retinex algorithm using the DRC technique, which is designed based on a retinex theory, exhibits a high performance in increasing brightness of an image. The retinex algorithm is a method of synthesizing an image by reducing an effect of illuminance, increasing reflectance of an input image after estimating illuminance of the input image by using a Gaussian filter and obtaining a reflectance image that includes a feature of an object by removing the illuminance of the input image. However, in order to estimate illuminance, a sufficiently large Gaussian filter is needed, and a halo artifact occurs on a portion of an image which has large brightness differences.

SUMMARY

One or more exemplary embodiments provide an image processing apparatus that may minimize occurrence of a halo artifact effect by using an optimized dynamic range compression (DRC) technique and increase contrast of an image.

One or more exemplary embodiments also provide a method of processing an image by using the image processing apparatus.

According to an aspect of an exemplary embodiment, there is provided a method of processing an input image, the method including: obtaining a first blurred image and a second blurred image from the input image; estimating illuminance of the input image by combining the first blurred image and the second blurred image; generating a dark region amplified image from the input image; generating a bright region conserved image from the input image; applying weights to the dark region amplified image and the bright region conserved image, respectively, according to the estimated illuminance; and combining the weighted dark region amplified image and the weighted bright region conserved image to generate a final image.

In the above, the input image may be an image which is filtered to uniformly distribute information of the input image over an entire region of a histogram of the input image.

The filtering may include: generating a first curve and a second curve having different amplification degrees; applying other weights to the first curve and the second curve, respectively, according to a ratio between a first maximum value and a second maximum value, wherein the first maximum value and the second maximum value are obtained by passing the input image through the first curve and the second curve, respectively; generating a third curve by summing the weighted first curve and the weighted second curve; and passing the input image through the generated third curve.

The estimating the illuminance may include: down-sampling the input image; generating the first blurred image by interpolating the down-sampled input image; generating the second blurred image formed of maximum value pixels respectively included in predetermined-size blocks of the input image; applying other weights to the first blurred image and the second blurred image, respectively, according to characteristics of the input image; combining the weighted first blurred image and the weighted second blurred image; and calculating the estimated illuminance from the combined image.

The method may further include processing an entire brightness of the combined image to be uniform and generate the estimated illuminance therefrom.

The generating the dark region amplified image may include: amplifying brightness of a dark region of the input image, and increasing contrast of the dark region of the input image; and increasing contrast of a local region in the dark region the contrast of which is increased.

The generating the bright region conserved image may include: maintaining brightness of a bright region having greater brightness than a medium-brightness region of the input image; and increasing contrast of the medium-brightness region of the input image.

The weights applied to the dark region amplified image and the bright region conserved image may be different from each other according to whether the estimated illuminance is lower than a critical value.

The weight applied to the dark region amplified image may be greater than the weight applied to the bright region conserved image if the estimated luminance is lower than the critical value.

The combining process may further include increasing contrast of the final image by performing brightness amplification of a dark region of the final image.

According to an aspect of another exemplary embodiment, there is provided an image processing apparatus including: an illuminance estimation unit configured to obtain a first blurred image and a second blurred image from an input image and estimate illuminance of the input image by combining the first blurred image and the second blurred image according to characteristics of the input image; a dark region amplifying unit configured to generate a dark region amplified image from the input image; a bright region conservation unit configured to generate a bright region conserved image from the input image; and a combination unit configured to apply weights to the dark region amplified image and the bright region conserved image, respectively, according to the estimated illuminance, and combine the weighted dark region amplified image and the weighted bright region conserved image to generate a final image.

The image processing apparatus may further include a filtering unit configured to generate the input image by uniformly distributing information of the input image over an entire region of a histogram of the input image.

The illuminance estimation unit may further include: a first blurring unit configured to down-sample the input image and generate the first blurred image by interpolating the downsampled input image; a second blurring unit configured to generate the second blurred image formed maximum value pixels respectively included in predetermined-size blocks of the input image; and an illuminance computation unit configured to apply other weights to the first blurred image and the second blurred image, respectively, according to characteristics of the input image, combine the weighted first blurred image and the weighted second blurred image, and calculate the estimated illuminance from the combined image.

The image processing apparatus may further include a halo artifact reducing unit configured to process an entire brightness of the combined image to be uniform and generate the estimated illuminance therefrom.

The dark region amplifying unit may include: a global contrast increasing unit configured to amplify brightness of a dark region of the input image, and increase contrast of the dark region of the input image; and a local contrast increasing unit configured to increase contrast of a local region in the dark region the contrast of which is increased.

The bright region conservation unit may be configured to maintain brightness of a bright region having greater brightness than a medium-brightness region of the input image, and increase contrast of the medium-brightness region of the input image.

The weights applied to the dark region amplified image and the bright region conserved image may be different from each other according to whether the estimated illuminance is lower than a critical value.

The weight applied to the dark region amplified image may be greater than the weight applied to the bright region conserved image if the estimated luminance is lower than the critical value.

According to an aspect of still another exemplary embodiment, there is provided a non-transitory computer readable medium storing a computer program for executing the method of the above.

According to the present inventive concept, occurrence of a halo artifact may be minimized and contrast of an image may be increased by using an optimized DRC technique.

BRIEF DESCRIPTION OF THE DRAWINGS

The above and other features will become more apparent by describing in detail exemplary embodiments with reference to the attached drawings, in which:

FIG. 4 is a drawing showing images for explaining the illuminance estimation unit of FIG. 1, according to an exemplary embodiment;

FIGS. 7A and 7B illustrate a detail block diagram of a brightness conservation unit and a drawing for explaining the bright region conservation unit of FIG. 1, according to an exemplary embodiment;

FIG. 9 is a flow diagram showing a method of processing an image, according to an exemplary embodiment.

DETAILED DESCRIPTION OF THE EXEMPLARY EMBODIMENTS

Figure 1:
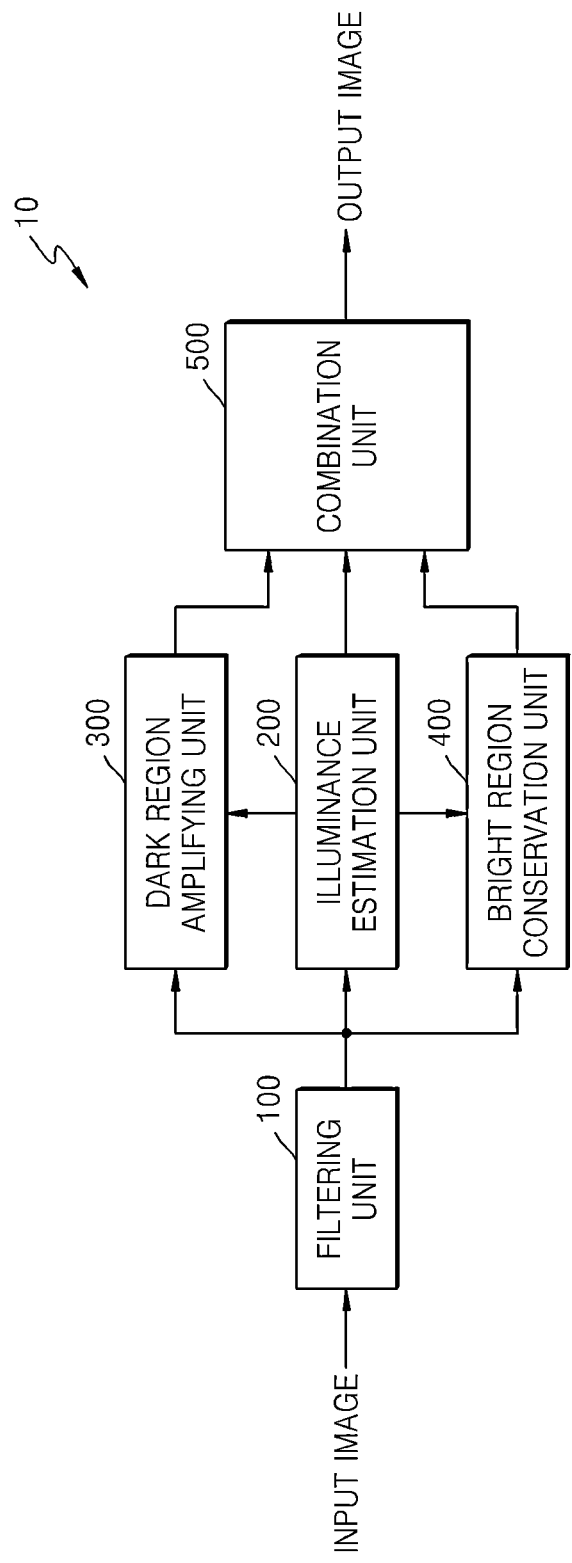
FIG. 1 is a block diagram showing a configuration of an image processing apparatus according to an exemplary embodiment.

While exemplary embodiments of the inventive concept are capable of various modifications and alternative forms, the embodiments thereof are shown by way of example in the drawings and will herein be described in detail. It should be understood, however, that there is no intent to limit the embodiments to the particular forms disclosed, but on the contrary, the embodiments are to cover all modifications, equivalents, and alternatives falling within the scope of the inventive concept. In describing the inventive concept, when practical descriptions with respect to related known functions and configurations may unnecessarily make the scope of the inventive concept unclear, the descriptions thereof will be omitted.

It will be understood that, although the terms 'first', 'second', etc. may be used herein to describe various elements, these elements should not be limited by these terms. These terms are only used to distinguish one element from another.

The terminologies used herein are for the purpose of describing embodiments only and are not intended to be limiting of the embodiments. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

The inventive concept may be expressed as functional block configurations and various processing steps. The functional blocks may be realized by a configuration of various hardware and/or software that perform specific functions. For example, the inventive concept may employ direct circuit configurations such as memory, processing, logic, and look-up tables that can perform various functions by at least one microprocessor or other control devices. Similar to the configuration elements of the inventive concept that may be executed by software programming or software elements, the inventive concept may also be realized by programming or scripting languages, such as C, C++, Java, and assembly, including various algorithms that are realized in combination of data structures, processors, routines, or other programming configurations. The functional aspects may be realized in an algorithm that is performed in at least one processor. Also, the inventive concept may employ a conventional technique for electronic environment sett-up, signal processing, and/or data processing. Terms such as mechanism, element, means, configuration may be used in a broad sense, and are not limited to mechanical and physical configurations. The terms may include meanings of a series of routines of software in connection with a processor.

Hereafter, the inventive concept will be described more fully with reference to the accompanying drawings, in which the exemplary embodiments are shown. In describing the embodiments with reference to drawings, like reference numerals are used for elements that are substantially identical or correspond to each other, and the descriptions thereof will not be repeated.

Performance of image obtaining apparatuses such as digital cameras is continuously being improved. However, in the case of general charge coupled devices (CCDs) or complementary metal oxide semiconductor (CMOS) sensors, information of a bright region or a dark region is erased due to the limit of a dynamic range. Here, the dynamic range refers to a brightness ratio between a brightest region and a darkest region in an image. A dynamic range of a sensor used in an image obtaining apparatus is much smaller than that of an obtained actual image, and thus, all of the brightness range of the obtained actual image may not be expressed. A high dynamic range (HDR) image has a dynamic range greater than a range that may be possibly expressed in either a general image obtaining apparatus or in a general display apparatus. Accordingly, the HDR image may be able to express brightness information closer to an actual image than a general image. Therefore, when an HDR image is obtained, details of bright regions and dark regions that are not recognized in a general image may be obtained.

A dynamic range of an HDR image is greater than a dynamic range which a display apparatus may be able to express in an image. Therefore, in order to express an HDR image in a display apparatus, a wide dynamic range should be compressed to a dynamic range of the display apparatus. This process is referred to as tone mapping or a dynamic range compression (DRC). A compression result may be obtained by designing a global tone mapping curve. A resultant image obtained in this way has, as a whole, a very poor contrast and cannot properly express dark regions and bright regions, and thus, cannot express a wide dynamic range obtained through an HDR composition. Accordingly, the image processing method according to the inventive concept may be able to express information of dark regions and bright regions in one HDR image by distinguishing between the dark regions and the bright regions of the HDR image and applying an amplifying method in which information of the dark regions are adaptively amplified according to the characteristic of the HDR image.

FIG. 1 is a block diagram showing a configuration of an image processing apparatus 10 according to an exemplary embodiment.

Referring to FIG. 1, the image processing apparatus 10 includes a filtering unit 100, an illuminance estimation unit 200, a dark region amplifying unit 300, a bright region conservation unit 400, and a combination unit 500.

The filtering unit 100 uniformly distributes information of an input HDR image over an entire region of a histogram. Since the input HDR image has a wide dynamic range, most of the information is contained in a dark region of the histogram. This biased distribution of information in the dark region may not enable effective application of the dynamic range compression. Accordingly, the filtering unit 100 performs the above-described uniform distribution of information of the input HDR image over the entire region of a histogram.

The filtering unit 100 generates a first over-curve and a second over-curve that has a different degree of amplification than that of the first over-curve. Here, the over-curve indicates a curve that can amplify the input HDR image. The filtering unit 100 generates a third curve by adding up weights of the first over-curve and the second over-curve according to a ratio between a first maximum value and a maximum second value. The first maximum value is the maximum value among values outputted from the first over-curve after passing the input HDR image through the first over-curve, and the second maximum value is the maximum value among values outputted from the second over-curve after passing the input HDR image through the second over-curve. Here, values that are smaller than the maximum value of the input HDR image by a predetermined ratio (for example, 0.001%) are selected as the first and second maximum values. This is because an unwanted value such as a much higher or lower value than other information in the input HDR image or noise may end up being obtained as the maximum value. Therefore, a stability of algorithms may be ensured by limiting the first and second maximum values to be smaller by a predetermined ratio than the maximum value of the input HDR image. Afterwards, when the input HDR image passes through the third curve, the overall brightness of the input HDR image is increased. Here, the value of the input HDR image may indicate a pixel value such as intensity of brightness and/or a color value of a pixel of the image. In the current embodiment, two over-curves are used in the filtering unit 100. However, the inventive concept does not limit the number of over-curves to two, and thus, a different number of over-curve may be used to implement the filtering unit 100, according to an exemplary embodiment.

Figure 2:
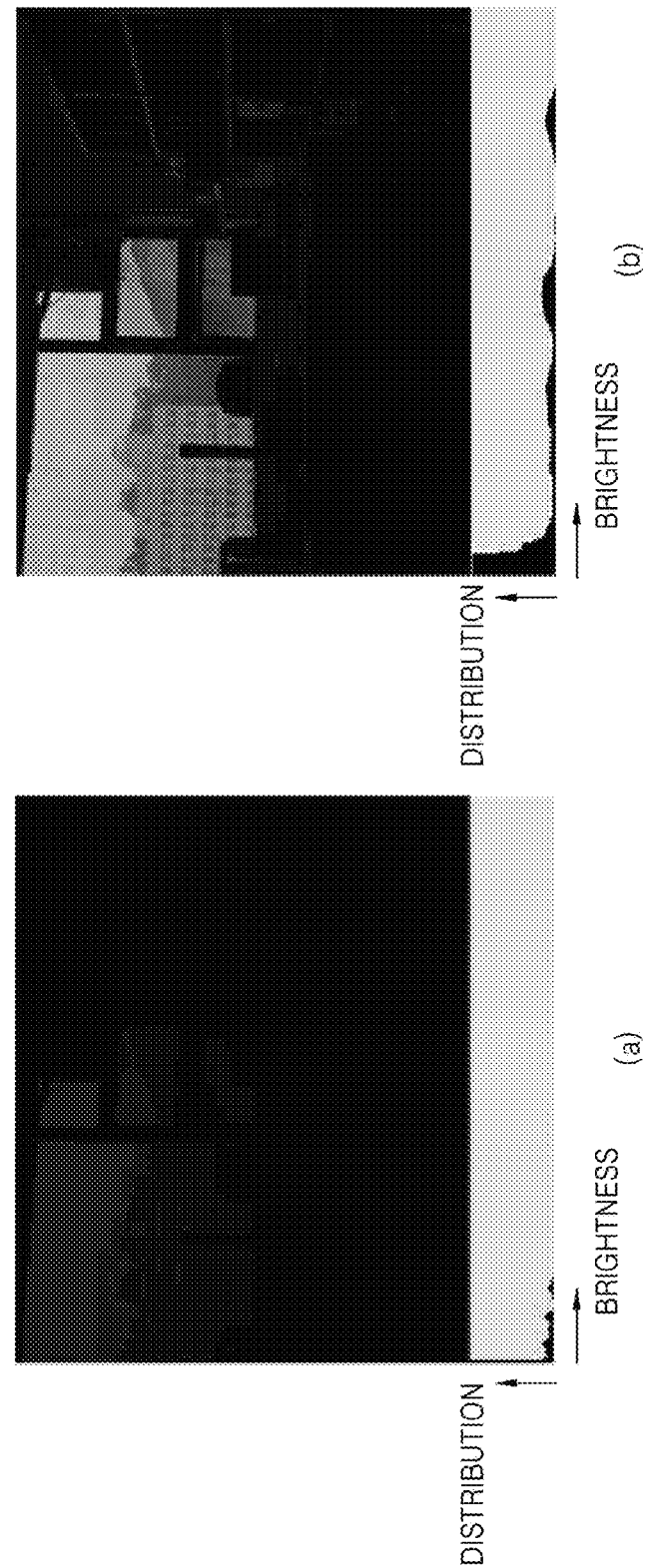
FIG. 2 is a drawing showing images before and after filtering an image of FIG. 1, according to an exemplary embodiment.

FIG. 2A shows an image to which a filtering is not applied to the input HDR image, and FIG. 2B shows an image to which a filtering is applied to the input HDR image. Referring to FIG. 2A, the image to which a filtering is not applied is very dark, and, in the histogram below the image, it is seen that most of the brightness information is contained in a dark region. Referring to FIG. 2B, however, the image to which a filtering is applied is brighter than the image of FIG. 2A, and in the histogram below the image in FIG. 2B, it is seen that brightness information is uniformly distributed over the entire region of the histogram. In this way, when the brightness information is uniformly distributed over the entire region of the histogram, a dynamic range compression may be effectively performed, and as a result, a good result may be obtained.

The filtering unit 100 may not be included in the image processing apparatus 10 according to an exemplary embodiment. When the filtering unit 100 is included, a signal input to the illuminance estimation unit 200, the dark region amplifying unit 300 and the bright region conservation unit 400 may be a filtered HDR image. However, if the filtering unit 100 is not included, a signal input to the illuminance estimation unit 200, the dark region amplifying unit 300 and the bright region conservation unit 400 is an input HDR image which is not filtered. Hereinafter, for convenience of explanation, the case in which the filtering unit 100 is not included is described.

The illuminance estimation unit 200 acquires a first blurring image and a second blurring image from the input HDR image and estimates an illuminance value by combining the first and second blurring images according to the characteristics of the input HDR image. The illuminance value is obtained by mainly using a blurring image for naturalness of a resultant image. The quality of the resultant image may vary according to the degree of blurring. The higher the degree of blurring, the higher the global contrast of the resultant image, and the resultant image is accompanied by a halo artifact. The lower the degree of blurring, the poorer the global contrast of the resultant image. Accordingly, it is required to combine the first and second blurring images appropriately to form some images.

Figure 3:
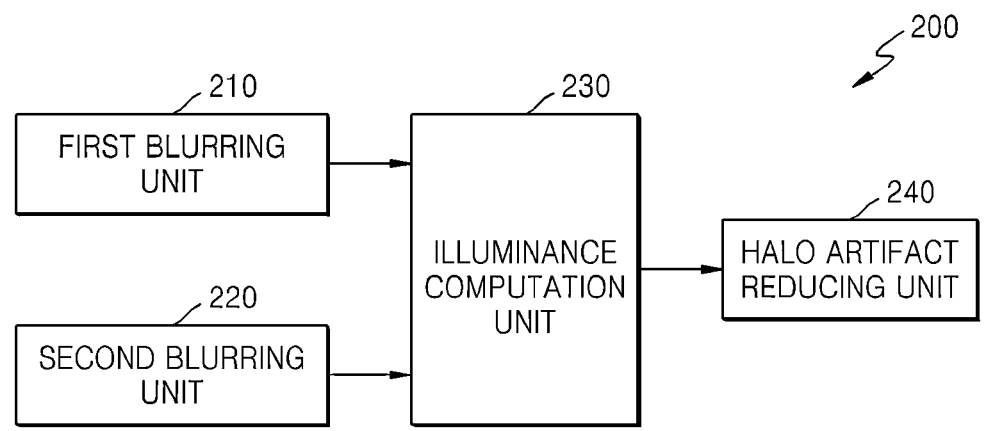
FIG. 3 is a detail block diagram showing an illuminance estimation unit of FIG. 1, according to an exemplary embodiment.

FIG. 3 is a detail block diagram showing the illuminance estimation unit 200 of FIG. 1, according to an exemplary embodiment. Referring to FIG. 3, the illuminance estimation unit 200 includes a first blurring unit 210, a second blurring unit 220, an illuminance calculation unit 230, and a halo artifact reducing unit 240. The illuminance estimation unit 200 will be described with reference to FIGS. 3 through 5.

The first blurring unit 210 interpolates an input HDR image after down-sampling the input HDR image, and generates a first blurred image having a blurring degree greater than that of the second blurred image generated by the second blurring unit 220. It is appropriate to blur the first blurred image by using a mask having a size of 129×129 blocks. However, due to heavy load of hardware, in the current embodiment, in consideration of a hardware design, an interpolation method is used after down-sampling the input HDR image instead of using a large blurring mask. Referring to FIG. 4, the first blurred image (a) depicted in FIG. 4 is a result of interpolating to the same size of the input HDR image after the input HDR image is down-sampled to a size of 12×9 inches.

The second blurring unit 220 scans the input HDR image by dividing the input HDR image into N×N blocks (for example, 3×3 blocks) in a unit of a pixel, and generates a second blurred image formed of maximum value pixels each of which has the maximum pixel value among pixels in a N×N block in the input HDR image. Here, the second blurred image has a degree of blurring smaller than that of the first blurred image. FIG. 4 shows the second blurred image (b) formed of maximum value pixels extracted while scanning a filtered HDR image in a 3×3 block.

The illuminance calculation unit 230 calculates illuminance of an image generated by combining the first and second blurred images, the first and second blurred images having different weights respectively applied to them according to characteristics (for example, average or variance of pixel values) of the input HDR image. In FIG. 4, an image (c) is the image in which a calculated illuminance has been applied to the input HDR image according to the combination of the first and second blurred images to which different weights have been applied. In the current embodiment, two blurring units are used in the illuminance estimation unit 200 to generate two blurred images. However, the inventive concept does not limit the number of blurring units and blurred images to two, and thus, a different number of blurring units and blurred images may be used to implement the illuminance estimation unit 200, according to an exemplary embodiment. Also, the inventive concept is not limited to an embodiment in which the number of blurring units is the same as the number of blurred images generated by the blurring units, and thus, the number of blurred images and the number of blurring units to generate the blurred images may be different from each other.

Figure 5A:
FIGS. 5A-5D illustrate images for explaining a reduction of a halo artifact of FIG. 3, according to an exemplary embodiment.
Figure 5B:
Figure 5C:
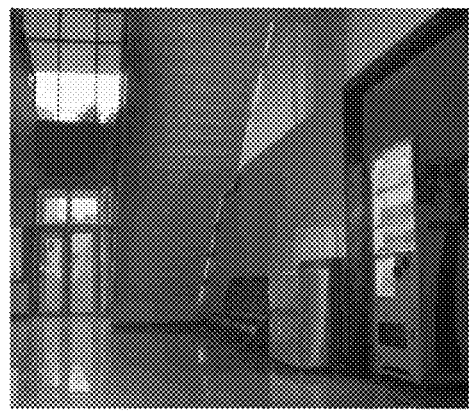
Figure 5D:
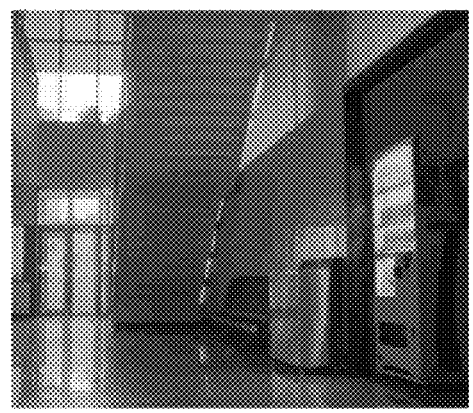

In a case of an image having large brightness differences in regions of the image, a halo artifact is generated even though illuminance calculated in the above-described manner is applied to the input HDR image. This is because, when there are large brightness differences between some regions in the input HDR image, the degree of variation of the illuminance is large. FIG. 5A shows an example image in which a halo artifact is generated after processing the input HDR image by using the method described above. The halo artifact reducing unit 240 renders an entire brightness of illuminance of the input HDR image to be uniform by passing the input HDR image, to which the illuminance calculated in the above-described manner is applied, through a reverse S type curve, and then, generates estimated illuminance of the input HDR image from the input HDR image which has passed through the reverse S type curve. Here, the reverse S type curve denotes a curve that renders brightness of a medium-brightness region, among a dark region, the medium-brightness region and a bright region of the input HDR image, to be uniform in the input HDR image. Since the brightness of the illuminance is uniform, the halo artifact of the resultant image may be reduced. FIG. 5C shows an image from which illuminance is estimated at the illuminance estimation unit 200, that is, the reverse S type curve is applied to the input HDR image by the halo artifact reducing unit 240. In the case of the image of FIG. 5A, a left side of the image is very bright due to light outside the window, but a right side of the image is very dark due to little light enters. In FIG. 5B, a boundary between the dark region and the bright region is smoothly displayed, but the severe difference in brightness may result in a halo artifact. However, in the case of the image of FIG. 5C, it is seen that the brightness of illuminance of the image is made uniform when the reverse S type curve is applied to the input HDR image which is processed at the illuminance calculation unit 230. FIG. 5D shows a final output image when the input HDR image passes through the combination unit 500 as shown in FIG. 1. Referring to FIG. 5D, it is confirmed that the halo artifact has disappeared, and also, the contrast of the image has not been damaged.

In the above-described manner, the illuminance estimation unit 200 estimates illuminance through image blurring, and thus, the amount of calculation may be reduced when compared to a related art method of estimating illuminance by using a Gaussian filter, and also, the occurrence of a halo artifact may be minimized.

Figure 6A:
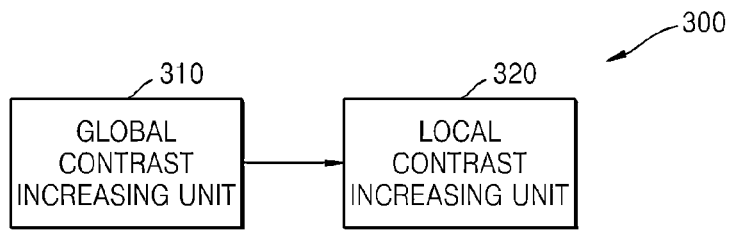
FIGS. 6A and 6B illustrate a detail block diagram of a dark region amplification unit and a drawing for explaining the dark region amplification unit of FIG. 1, according to an exemplary embodiment.
Figure 6B:
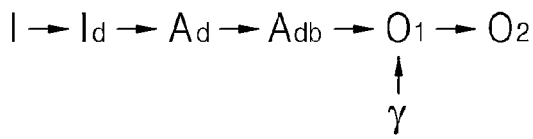

Referring to FIG. 1, the dark region amplifying unit 300 generates a dark region amplification image from the input HDR image. FIGS. 6A and 6B illustrate a detailed block diagram of the dark region amplifying unit 300 and a drawing for explaining the dark region amplification unit, according to an exemplary embodiment.

Referring to FIG. 6A, the dark region amplifying unit 300 includes a global contrast increasing unit 310 and a local contrast increasing unit 320. The global contrast increasing unit 310 outputs an image in which contrast is increased in a brightness amplification process of a dark region of the input HDR image. At this point, the local contrast increasing unit 320 increases contrast of a local region in the dark region.

The global contrast increasing unit 310 and the local contrast increasing unit 320 are described in detail with reference to FIG. 6B. When the input HDR image is referred to as I, the global contrast increasing unit 310 generates a blurred image $I_d$ formed of maximum value pixels, each of which has the maximum pixel value among pixels in a N×N block in the input HDR image, while scanning the input HDR image by dividing the input HDR image into the N×N blocks (for example, 3×3 blocks) in a unit of a pixel. Afterwards, the global contrast increasing unit 310 generates a value $A_d$ that indicates a ratio between an input and an output, wherein the input is a sum of the blurred image $I_d$ and a weight of illuminance estimated at the illuminance estimation unit 200, and the output is obtained by passing the input through an amplification function f(input). In the function f(input) equation, MAX indicates the brightest value of an image (for example, 255 in an 8-bit image) and δ is a coefficient that determines a slope of the function f(input) curve. Also, in the equation for generating the value $A_d$, s indicates the weight of illuminance, and, the larger the value s, the higher the contrast. Afterwards, the global contrast increasing unit 310 generates the value $A_{db}$ by applying a Gaussian blurring to the value $A_d$. Here, the applying of the Gaussian blurring is performed by using a mask having a predetermined size (for example, 1×3 blocks). The global contrast increasing unit 310 outputs a global contrast increasing result O1 by multiplying the input HDR image I with the $A_{db}$ value. When dark region amplification with respect to the input HDR image is performed, problems such as contrast reduction can occur in some regions in the input HDR image I. Accordingly, the global contrast increasing unit 310 simultaneously performs brightness amplification and contrast increase of the dark region by using the blurred image $I_d$ and the illuminance to which a weigh is applied.

In order to additionally increase contrast of local regions of the result O1 outputted from the global contrast increasing unit 310, the local contrast increasing unit 320 uses a blurred image, to which the input HDR image I and characteristics of ambient pixels are reflected, are used. That is, instead of an input HDR image I used to output the result O1 from the global contrast increasing unit 310, a value based on a ratio between the blurred image Id and the input HDR image I is used, and, as a result, a result O2 in which both the dark region contrast and the local contrast are increased is output. Here, γ is a coefficient for controlling a ratio between the blurred image Id and the input HDR image I.

Referring to FIG. 1 again, the bright region conservation unit 400 generates a bright region conservation image from the input HDR image I. In order to display the input HDR image I as a single screen image, a bright region should not be amplified when the dark region is amplified. However, the contrast of a resultant image may not be acceptable if the bright region is only maintained and not amplified. Accordingly, the bright region conservation unit 400 includes a middle-curve design and application unit 410 to generate a bright region conservation image by passing the input HDR image through a middle-curve corresponding to the middle-curve design.

FIGS. 7A and 7B illustrate a detail block diagram of the brightness conservation unit 400 and a drawing for explaining the bright region conservation unit 400. Referring to FIG. 7A, the middle-curve design and application unit 410 generates a middle-curve and outputs a result of applying the middle-curve to an input HDR image as a bright region conservation image. Herein, the middle-curve denotes a curve along which contrast of the medium-brightness region in the input HDR image, which passes through the curve, increases while the bright region maintains its current brightness. When the input HDR image passes through the middle-curve, an overall contrast of the image is increased.

The middle-curve design and application unit 410 will be described in detail with reference to FIG. 7B. When the input HDR image is referred to as I, the middle-curve design and application unit 410 generates a blurred image $I_d$ formed of maximum value pixels, each of which has the maximum pixel value among pixels in a N×N block in the input HDR image, while scanning the input HDR image by dividing the input HDR image into N×N blocks (for example, 3×3 blocks) in a unit of a pixel. Afterwards, the middle-curve design and application unit 410 generates a value $A'_d$ that indicates a ratio between an input and an output, wherein the input is a sum of a blurred image $I_d$ and a weight of illuminance estimated at the illuminance estimation unit 200, and the output is obtained by passing the input through an amplification function g(input). In the equation of the middle-curve amplification function g(input), MAX indicates the brightest value of the image (for example, 255 in an 8-bit image $2^8$=256; 0 to 255) and a is a coefficient for determining a slope of the middle-curve. Also, in the equation for generating the value $A'_d$, m indicates a weight of illuminance, and, the larger the m value, the higher the contrast. Afterwards, the middle-curve design and application unit 410 generates $A'_{db}$ by applying a Gaussian blurring to $A'_d$. Here, the Gaussian blurring may be performed by using a mask having a predetermined size (for example, 1×3 blocks when the Gaussian blurring is applied to $A'_d$. The middle-curve design and application unit 410 outputs a bright region conservation result $O_3$ by multiplying the input HDR image I with the $A'_{db}$ value.

Referring to FIG. 1 again, the combination unit 500 combines a dark amplification image and a bright region conservation image after applying weights to the two images, respectively, according to the illuminance estimated at the illuminance estimation unit 200. The combination unit 500 will be described in detail with reference to FIG. 8.

Figure 8:
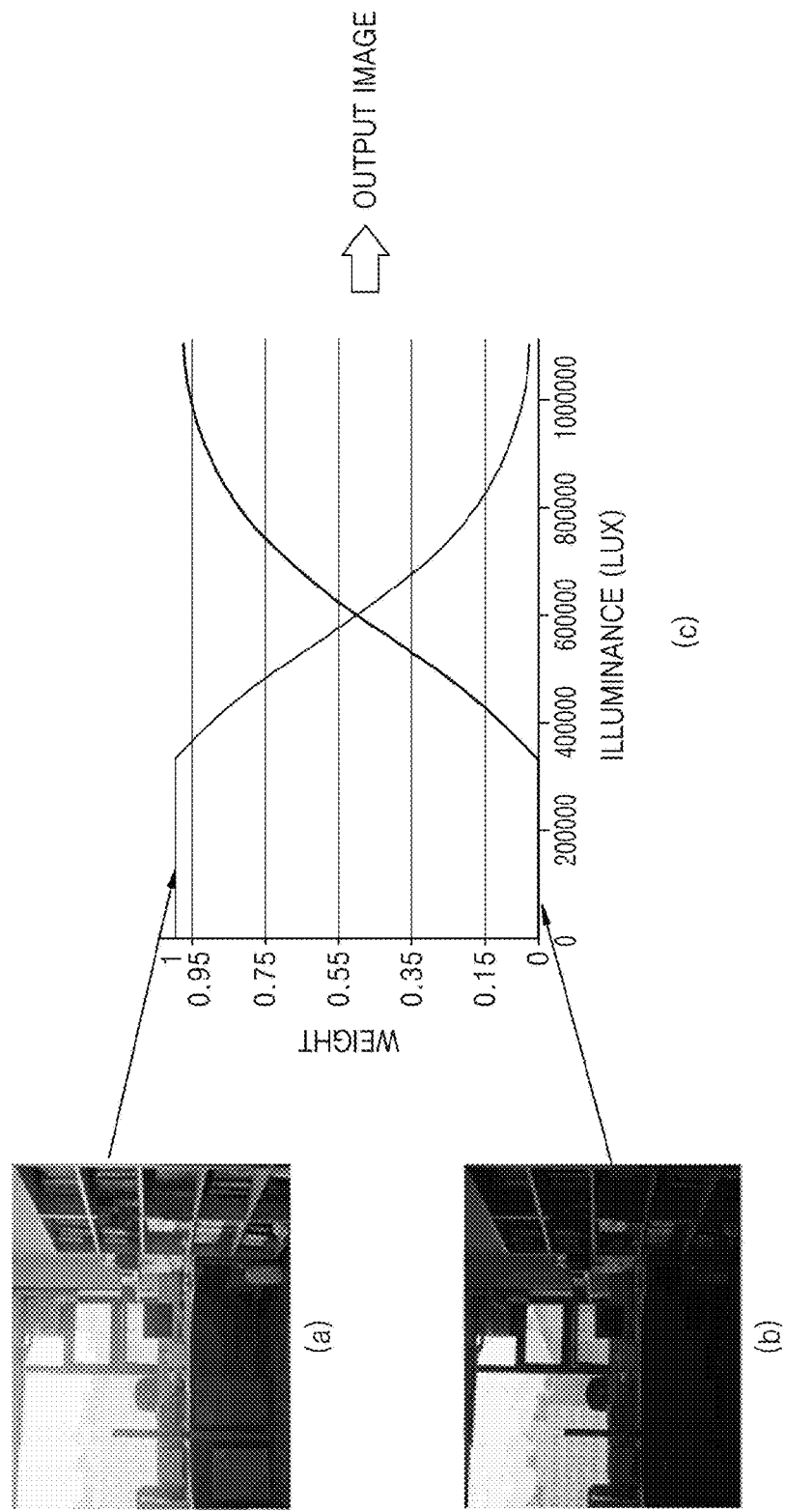
FIG. 8 illustrate a dark region amplified image, a bright region conserved image and a graph for explaining application of weights to the dark region amplified image and the bright region conserved image, according to an exemplary embodiment.

FIG. 8 shows a dark region amplified image (a) outputted from the dark region amplifying unit 300 and a bright region conserved image (b) outputted from the bright region conservation unit 400. FIG. 8 also shows a graph (c) for explaining application of weights to the dark region amplified image and the bright region conserved image according to estimated illuminance. For example, if an estimated illuminance is 60,000 lux, the weight for the dark region amplified image is set identical to that of the bright region conserved image, that is, approximately 0.5. The combination unit 500 amplifies the dark region amplified image and the bright region conserved image by the same weight 0.5. In the graph (c) of FIG. 8, based on a first critical value (for example, 60,000 lux) of illuminance, regions having illuminance greater than the first critical value indicate bright regions, and regions having illuminance lower than the first critical value indicate dark regions.

The combination unit 500 determines that an image having illuminance of lower than the first critical value is dark. Therefore, by applying to the dark region amplified image a weight that is higher than a weight applied to the bright region conserved image, the dark region amplified image and the bright region conserved image are combined. For example, referring to the graph (c) of FIG. 8, when the estimated illuminance is 40,000 lux, the combination unit 500 sets a weigh 0.9 to the dark region amplified image and a weigh 0.1 to the bright region conserved image. Afterwards, the dark region amplified image to which the weight 0.9 is applied and the bright region conserved image to which the weight 0.1 is applied are combined.

The combination unit 500 determines that an image having illuminance greater than the first critical value is bright. Therefore, after applying to the bright region conserved image a weight that is greater than a weight applied to the dark region amplified image, the dark region amplified image and the bright region conserved image are combined. For example, referring to the graph (c) of FIG. 8, when an estimated illuminance is 80,000 lux, the combination unit 500 applies a weight 0.81 to the dark region amplified image and a weight 0.19 to the bright region conserved image. Afterwards, the dark region amplified image to which the weight 0.19 is applied and the bright region conserved image to which the weigh 0.81 is applied are combined.

In the current embodiment, the combination unit 500 combines a dark region amplified image and a bright region conserved image by applying different weights to the dark region amplified image and the bright region conserved image, respectively. Accordingly, a dynamic range may be optimized when compared to a conventional tone mapping method. The combination unit 500 may also include another contrast increasing unit which increases contrast of a final image generated by combining the weighted dark region amplified image and the weighted bright region conserved image. Specifically, the contrast of the final image may be increased through brightness amplification of a dark region of the final image by the other contrast increasing unit.

In the current embodiment, an image inputted to the image processing apparatus 10 is an HDR image. However, the inventive concept is not limited thereto, that is, a general image (for example, a low dynamic range (LDR) image), and furthermore, a Bayer pattern image may be input to the image processing apparatus 10.

FIG. 9 is a flow diagram showing a method of processing an image, according to an exemplary embodiment. In the following descriptions, parts that have been described with reference to FIGS. 1 through 8 are not repeated.

Referring to FIG. 9, the image processing apparatus 10 obtains a first blurred image and a second blurred image from an input HDR image, and then, estimates illuminance by combining the first blurred image and the second blurred image according to the characteristics of the input HDR image (S10). The image processing apparatus 10 interpolates an input HDR image after down-sampling the input HDR image, and afterwards, generates the first blurred image having a blurring degree greater than that of the second blurred image. Also, the image processing apparatus 10 generates a second blurred image formed of maximum value pixels while scanning the input HDR image by dividing the input HDR image into N×N blocks (for example, 3×3 blocks) in a unit of a pixel. The second blurred image has a blurring degree lower than that of the first blurred image. The image processing apparatus 10, after generating the first and second blurred images, calculates illuminance from an image generated by combining the first blurred image and the second blurred image after applying weights to the two images, respectively, according to the characteristics (for example, average or variance of pixel values) of the input HDR image. In the case of an image having large brightness differences, a halo artifact may still be generated even though the illuminance is calculated by combining the weighted first blurred image and the weighted second blurred image. Accordingly, the image processing apparatus 10 may reduce a halo artifact by uniformly distributing brightness throughout the input HDR image by applying a reverse S type curve, and then, estimates illuminance from the input HDR image to which the reverse S type curve is applied.

The image processing apparatus 10 according to the current embodiment may perform filtering for uniformly distributing information of an input HDR image over an entire region of a histogram before estimating illuminance. The filtering may be omitted.

When the estimation of the illuminance is completed, the image processing apparatus 10 generates a dark region amplified image from the input HDR image (S20). In the process of amplifying the dark region of the input HDR image, the image processing apparatus 10 generates the dark region amplified image by performing a global contrast increasing process for increasing contrast of a dark region of the image and a local contrast increasing process that increases contrast with respect to a local region in the dark region, the contrast of which is increased.

Also, when the illuminance estimation is completed, the image processing apparatus 10 generates a bright region conserved image from the input HDR image (S30). In order to display an HDR image as a single screen image, the bright region should not be amplified when the dark region is amplified. However, if the bright region is only maintained and not amplified, the contrast of a resultant image may not be good. Accordingly, the image processing apparatus 10 generates a middle-curve, and generates a bright region conserved image by passing the input HDR image through the middle-curve.

Here, the middle-curve denotes a curve along which contrast of a medium-brightness region is increased until it is distinguishable by the human eye while maintaining the brightness of a bright region (for example, a region having brightness higher than the medium-brightness region that can be distinguishable by the human eye in the input HDR image. When the input HDR image passes through the middle-curve, a bright region conserved image in which contrast of the entire input HDR image is increased is generated. In FIG. 9, operation S30 is performed after operation S20. However, these two operations may be performed in a reverse order or at the same time, according to an exemplary embodiment.

When the illuminance estimation and the obtainment of a dark region amplified image and the bright region conserved image have been completed, the image processing apparatus 10 combines the dark region amplified image and the bright region conserved image by applying weights to the two images, respectively, according to the estimated illuminance (S40). The image processing apparatus 10 determines that an image is dark when the image has an illuminance of below the first critical value (for example, 60,000 lux), and, after applying to the dark region amplified image a weight that is greater than of a weight applied to the bright region conserved image, combines the dark region amplified image and the bright region conserved image. Also, the image processing apparatus 10 determines that an image is bright when the image has an illuminance that is higher than the first critical value, and, after applying a weight to the bright region conserved image that is greater than a weight that is applied to the dark region amplified image, combines the dark region amplified image and the bright region conserved image.

The above embodiments can also be embodied as computer readable codes on a computer readable recording medium. The computer readable recording medium is any data storage device that can store data which can be thereafter read by a computer system.

Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. (Also, functional programs, codes, and code segments for accomplishing the exemplary embodiments can be easily construed by programmers skilled in the art to which the inventive concept pertains.)

While this inventive concept has been particularly shown and described with reference to the above embodiments, it will be understood by those of ordinary skill in the art that various changes in form and details may be made therein without departing from the spirit and scope of the inventive concept as defined by the appended claims. The embodiments should be considered in a descriptive sense only and not for purposes of limitation. Therefore, the scope of the inventive concept is defined not by the detailed description of the inventive concept but by the appended claims, and all differences within the scope will be construed as being included in the inventive concept.

What is claimed is:

1. A method of processing an input image, the method comprising:
   obtaining a first blurred image and a second blurred image having different blurring degrees, from the input image;
   estimating illuminance of an image generated by combining the first blurred image and the second blurred image;

generating a dark region amplified image from the input image by amplifying pixel values of a dark region in the input image;

generating a bright region conserved image from the input image by maintaining pixel values of a bright region in the input image;

applying weights to the dark region amplified image and the bright region conserved image, respectively, according to the estimated illuminance;

combining the weighted dark region amplified image and the weighted bright region conserved image to generate a final image in which occurrence of a halo artifact effect is reduced; and outputting the final image for display.

2. The method of claim 1, wherein the input image is an image which is filtered to uniformly distribute information of the input image over an entire region of a histogram of the input image.

3. The method of claim 2, wherein the filtering comprises:
generating a first curve and a second curve having different amplification degrees;
applying different weights to the first curve and the second curve, respectively, according to a ratio between a first maximum value and a second maximum value, wherein the first maximum value and the second maximum value are obtained by passing the input image through the first curve and the second curve, respectively;
generating a third curve by summing the weighted first curve and the weighted second curve; and
passing the input image through the generated third curve.

4. The method of claim 1, wherein the estimating the illuminance comprises:
down-sampling the input image;
generating the first blurred image by interpolating the down-sampled input image;
generating the second blurred image formed of maximum value pixels respectively included in predetermined-size blocks of the input image;
applying different weights to the first blurred image and the second blurred image, respectively, according to characteristics of pixel values of the input image;
combining the weighted first blurred image and the weighted second blurred image; and
calculating the estimated illuminance from the combined image.

5. The method of claim 4, further comprising processing an entire brightness of the combined image to be uniform and generate the estimated illuminance therefrom.

6. The method of claim 1, wherein the generating the dark region amplified image comprises:
amplifying brightness of a dark region of the input image, and increasing contrast of the dark region of the input image; and
increasing contrast of a local region in the dark region the contrast of which is increased.

7. The method of claim 1, wherein the generating the bright region conserved image comprises:
maintaining brightness of the bright region having greater brightness than a medium-brightness region of the input image; and
increasing contrast of the medium-brightness region of the input image.

8. The method of claim 1, wherein the weights applied to the dark region amplified image and the bright region conserved image are different from each other according to whether the estimated illuminance is lower than a critical value.

9. The method of claim 8, wherein the weight applied to the dark region amplified image is greater than the weight applied to the bright region conserved image if the estimated luminance is lower than the critical value.

10. The method of claim 1, further comprising increasing contrast of the final image by performing brightness amplification of a dark region of the final image.

11. An image processing apparatus comprising:
a memory comprising computer executable instructions;
a processor configured to execute the computer executable instructions to implement:
an illuminance estimation unit configured to obtain a first blurred image and a second blurred image having different blurring degrees from an input image, and estimate illuminance of an image generated by combining the first blurred image and the second blurred image according to characteristics of the input image;
a dark region amplifying unit configured to generate a dark region amplified image from the input image by amplifying pixel values of a dark region in the input image;
a bright region conservation unit configured to generate a bright region conserved image from the input image by maintaining pixel values of a bright region in the input image; and
a combination unit configured to apply weights to the dark region amplified image and the bright region conserved image, respectively, according to the estimated illuminance, and combine the weighted dark region amplified image and the weighted bright region conserved image to generate a final image for display in which occurrence of a halo artifact effect is reduced to output for display.

12. The image processing apparatus of claim 11, wherein the processor is further configured to execute the computer executable instructions to implement a filtering unit configured to generate the input image by uniformly distributing information of the input image over an entire region of a histogram of the input image.

13. The image processing apparatus of claim 11, wherein the illuminance estimation unit comprises:
a first blurring unit configured to down-sample the input image and generate the first blurred image by interpolating the down-sampled input image;
a second blurring unit configured to generate the second blurred image formed maximum value pixels respectively included in predetermined-size blocks of the input image; and
an illuminance computation unit configured to apply different weights to the first blurred image and the second blurred image, respectively, according to characteristics of pixel values of the input image, combine the weighted first blurred image and the weighted second blurred image, and calculate the estimated illuminance from the combined image.

14. The image processing apparatus of claim 13, wherein the processor is further configured to execute the computer executable instructions to implement a halo artifact reducing unit configured to process an entire brightness of the combined image to be uniform and generate the estimated illuminance therefrom.

15. The image processing apparatus of claim 11, wherein the dark region amplifying unit comprises:
a global contrast increasing unit configured to amplify brightness of a dark region of the input image, and increase contrast of the dark region of the input image; and a local contrast increasing unit configured to increase contrast of a local region in the dark region the contrast of which is increased.

16. The image processing apparatus of claim 11, wherein the bright region conservation unit is configured to maintain brightness of the bright region having greater brightness than a medium-brightness region of the input image, and increase contrast of the medium-brightness region of the input image.

17. The image processing apparatus of claim 11, wherein the weights applied to the dark region amplified image and the bright region conserved image are different from each other according to whether the estimated illuminance is lower than a critical value.

18. The image processing apparatus of claim 17, wherein the weight applied to the dark region amplified image is greater than the weight applied to the bright region conserved image if the estimated luminance is lower than the critical value.

19. The image processing apparatus of claim 11, wherein the combination unit is further configured to increase contrast of the final image by performing brightness amplification of a dark region of the final image.

20. A non-transitory computer readable medium storing a computer program for executing the method of claim 1.

* * * * *